(12) United States Patent
Kurihara et al.

(10) Patent No.: US 6,678,800 B1
(45) Date of Patent: Jan. 13, 2004

(54) CACHE APPARATUS AND CONTROL METHOD HAVING WRITABLE MODIFIED STATE

(75) Inventors: Akihiro Kurihara, Kawasaki (JP); Tsuyoshi Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 183 days.

(21) Appl. No.: 09/667,223

(22) Filed: Sep. 21, 2000

(30) Foreign Application Priority Data

Oct. 8, 1999 (JP) .......................................... 11-287757

(51) Int. Cl.⁷ ................................................ G06F 12/00

(52) U.S. Cl. ...................................... 711/144; 711/141

(58) Field of Search ................................ 711/141, 146, 711/145, 144, 142, 143, 119, 130

(56) References Cited

U.S. PATENT DOCUMENTS 6,321,306 B1 * 11/2001 Arimilli ...................... 711/145
6,334,172 B1 * 12/2001 Arimilli ...................... 711/144

* cited by examiner

Primary Examiner—Kimberly McLean-Mayo
(74) Attorney, Agent, or Firm—Staas & Halsey LLP

(57) ABSTRACT

A cache controller expresses a status of a data block by one of six statuses obtained by newly adding Writable Modified to Invalid, Shared, Exclusive, Modified, and Shared Modified. In response to a fetching request from a self system CPU for a data block having the status of Invalid I, when the data block having the status of Modified M is obtained from a cache apparatus of another system, the cache controller changes the status of the obtained data block from Invalid to Writable Modified. The cache controller also switches the status of the data block on the obtaining destination side from Modified to Invalid. As a result, the making of a status change notification to the other system in response to a subsequent storing request from the self system CPU, is unnecessary.

11 Claims, 21 Drawing Sheets

FETCHING PROTOCOL

STORING PROTOCOL

SELF →   OTHER ⇢

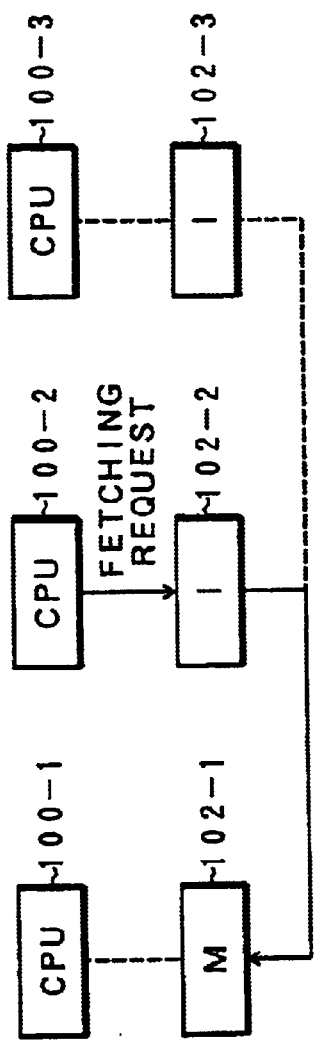
F I G. 2A
FETCHING REQUEST OF
SELF SYSTEM CPU
PRIOR ART
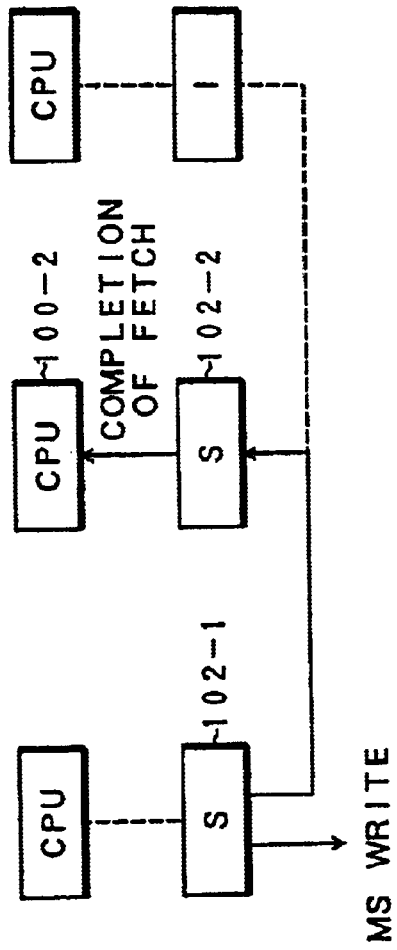
F I G. 2B
COMPLETION OF FETCH
OF SELF SYSTEM CPU
PRIOR ART

STORING REQUEST OF
SELF SYSTEM CPU
PRIOR ART

STORING PROCESS OF
SELF SYSTEM CPU
PRIOR ART

COMPLETION OF STORAGE
OF SELF SYSTEM CPU
PRIOR ART

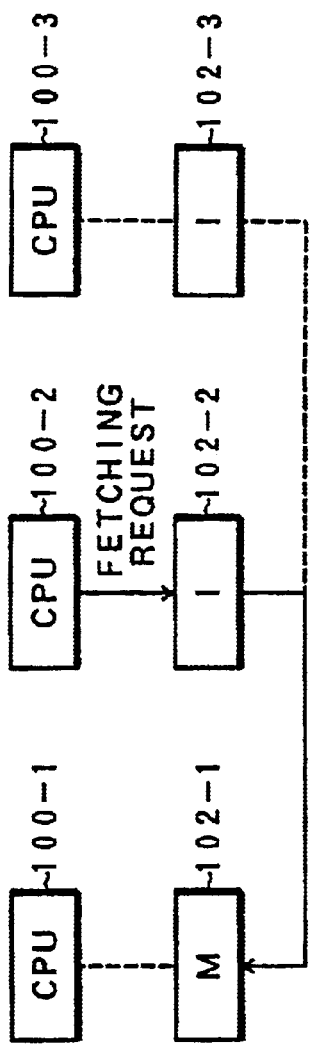
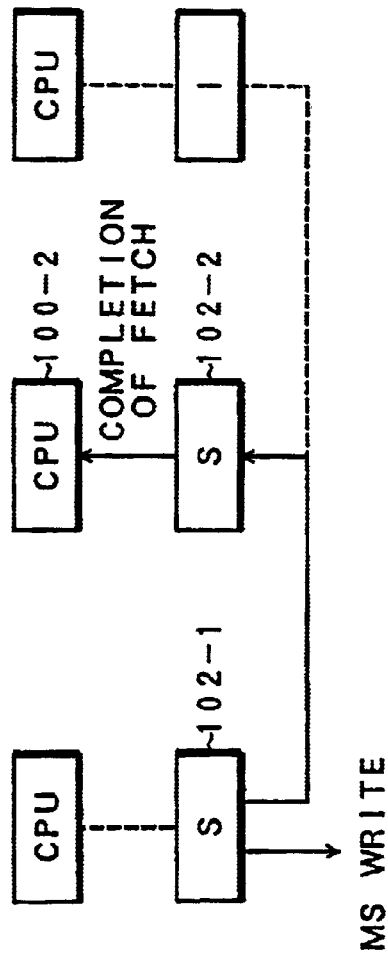
FIG. 3A
FETCHING REQUEST OF
SELF SYSTEM CPU
PRIOR ART
FIG. 3B
COMPLETION OF FETCH
OF SELF SYSTEM CPU
PRIOR ART

FETCHING REQUEST OF
OTHER SYSTEM CPU

PRIOR ART

COMPLETION OF FETCH
OF OTHER SYSTEM CPU

PRIOR ART

FETCHING PROTOCOL

FETCHING PROTOCOL

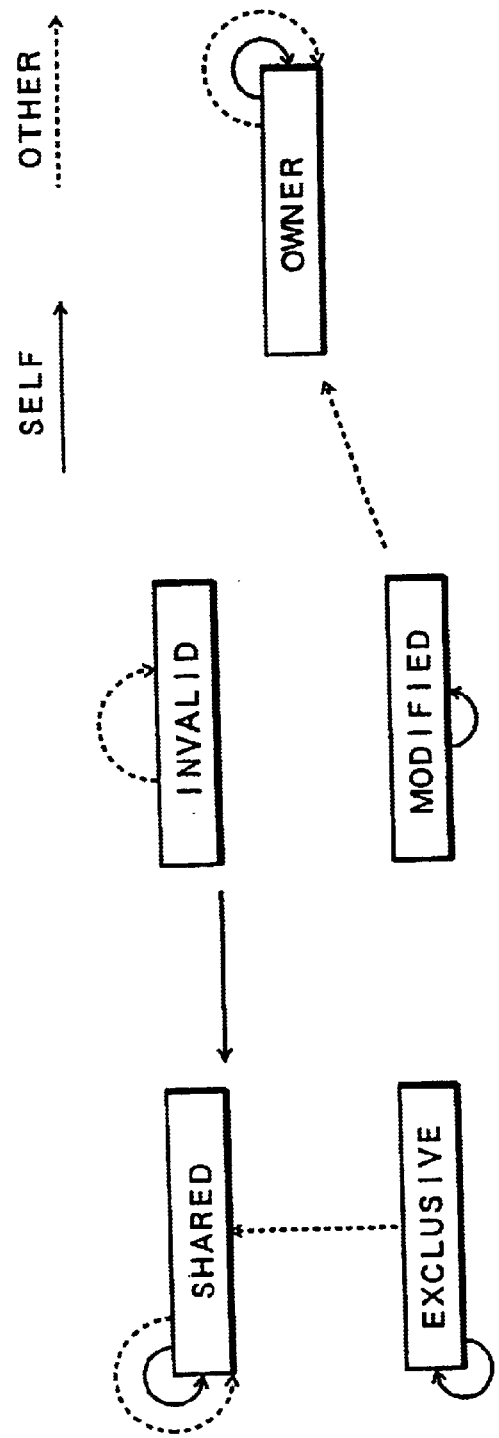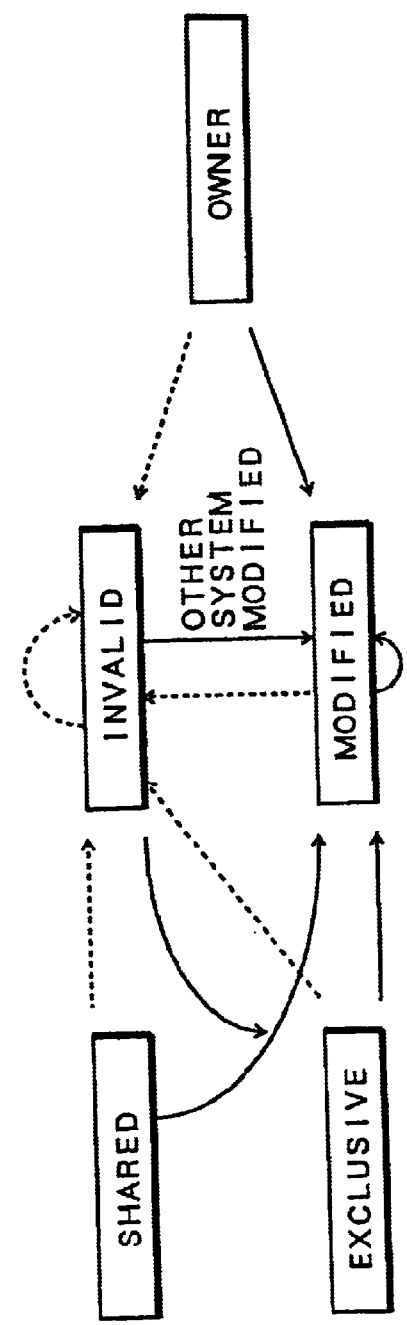
FIG. 5A FETCHING PROTOCOL PRIOR ART
FIG. 5B STORING PROTOCOL PRIOR ART

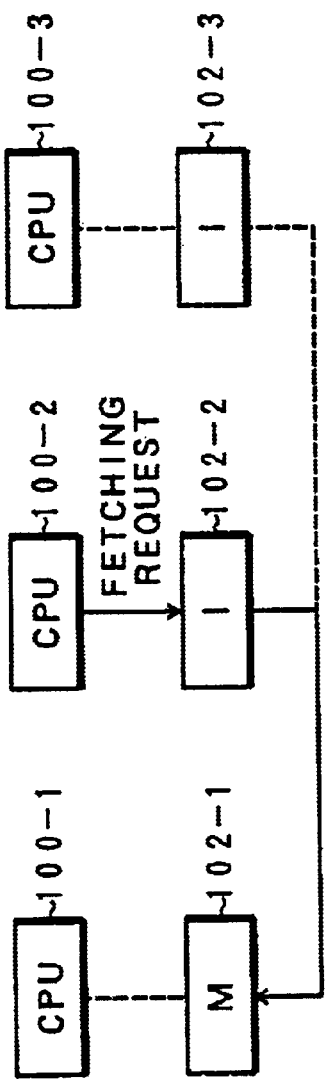
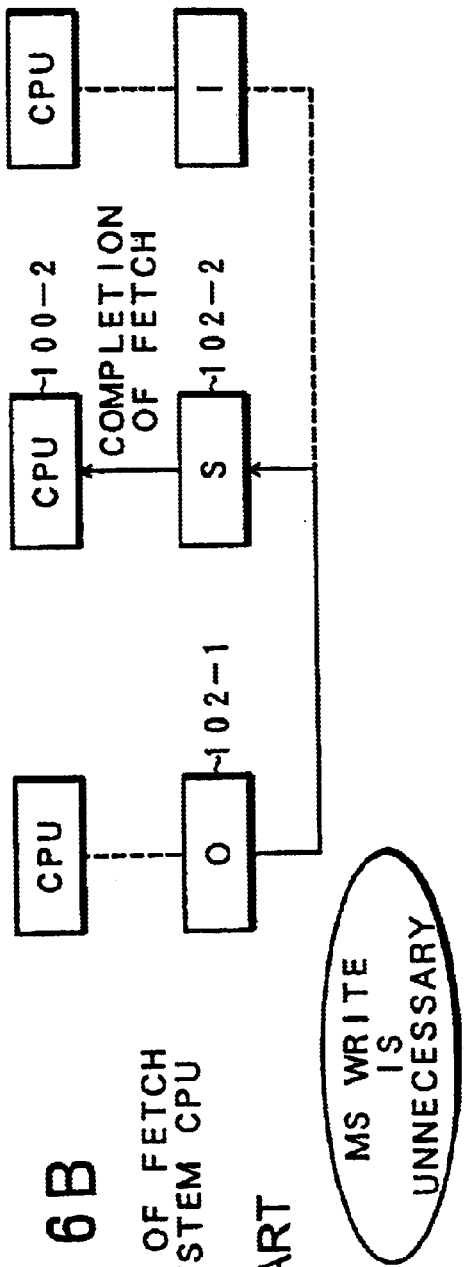
FIG. 6A
FETCHING REQUEST OF SELF SYSTEM CPU
PRIOR ART
FIG. 6B
COMPLETION OF FETCH OF SELF SYSTEM CPU
PRIOR ART
MS WRITE IS UNNECESSARY

STORING REQUEST OF
SELF SYSTEM CPU
PRIOR ART

STORING PROCESS OF
SELF SYSTEM CPU
PRIOR ART

COMPLETION OF STORAGE
OF SELF SYSTEM CPU
PRIOR ART

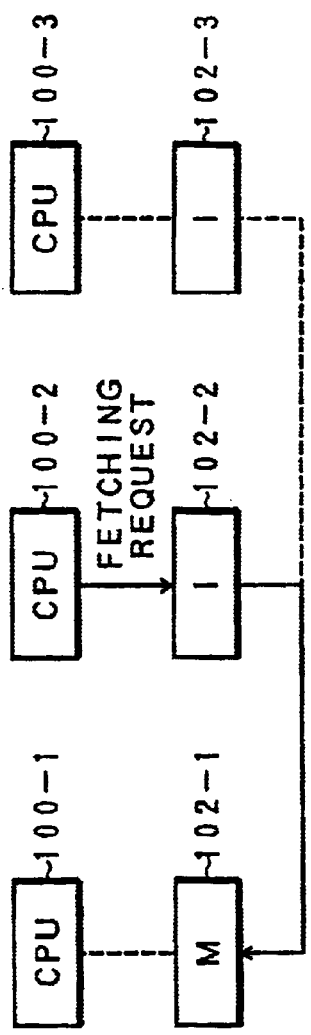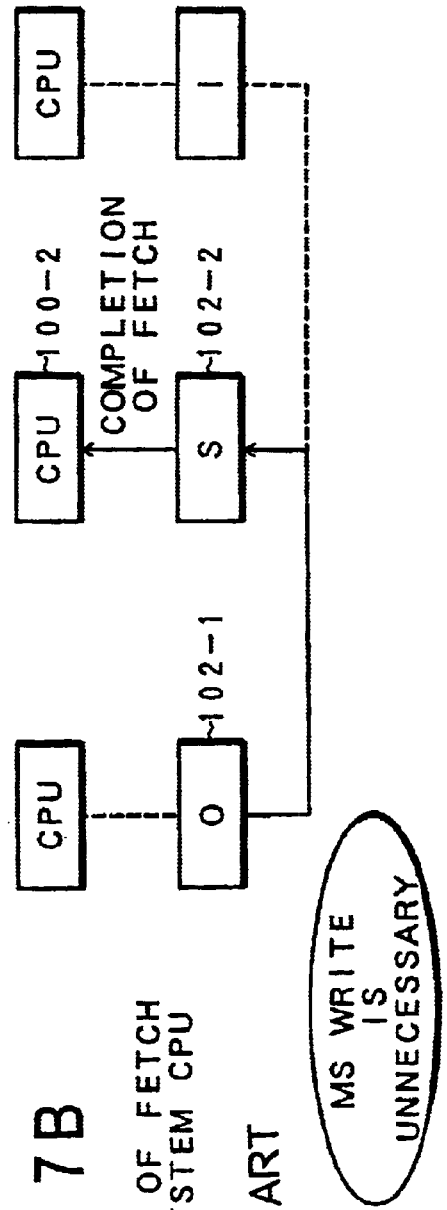
FIG. 7A
FETCHING REQUEST OF SELF SYSTEM CPU
PRIOR ART
FIG. 7B
COMPLETION OF FETCH OF SELF SYSTEM CPU
PRIOR ART

FETCHING REQUEST OF OTHER SYSTEM CPU
PRIOR ART

COMPLETION OF FETCH OF OTHER SYSTEM CPU
PRIOR ART

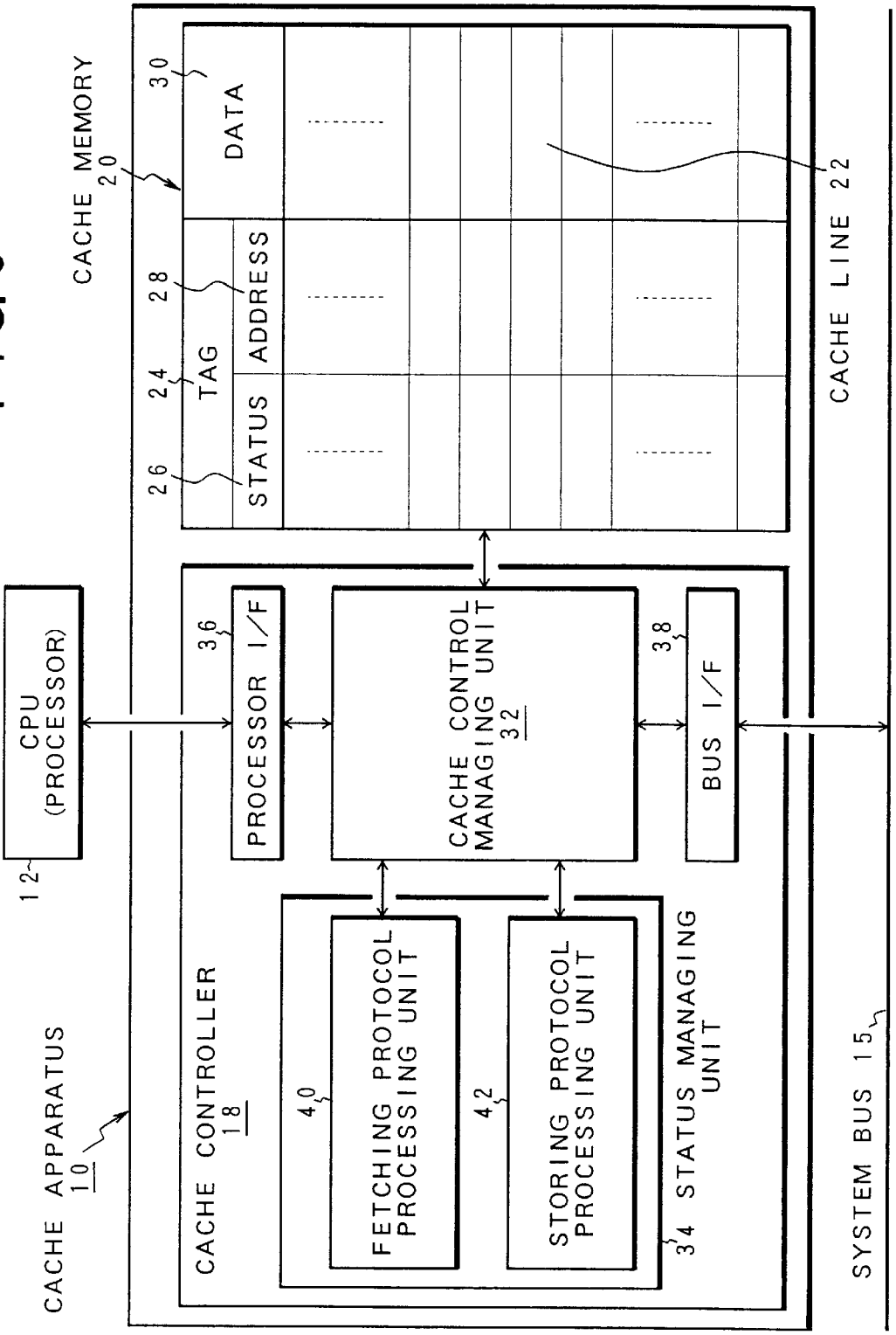

FETCHING PROTOCOL

STORING PROTOCOL

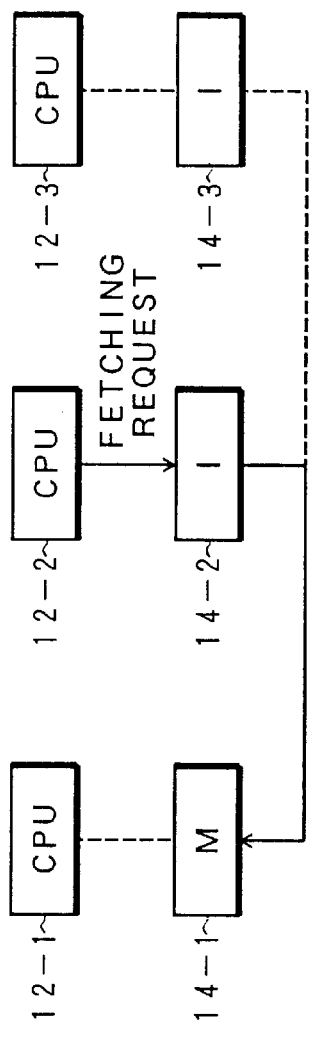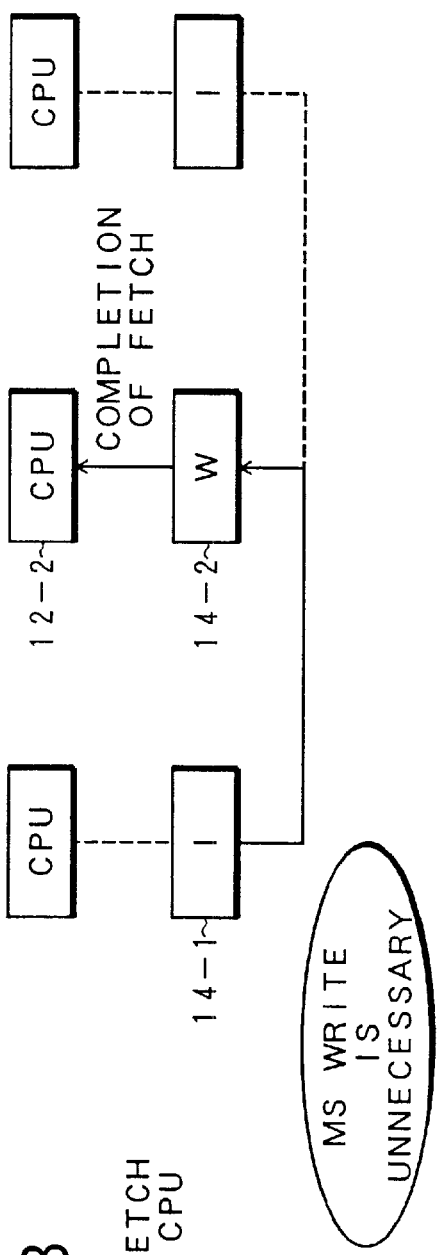
FIG. 11A
FETCHING REQUEST OF
SELF SYSTEM CPU
FIG. 11B
COMPLETION OF FETCH
OF SELF SYSTEM CPU

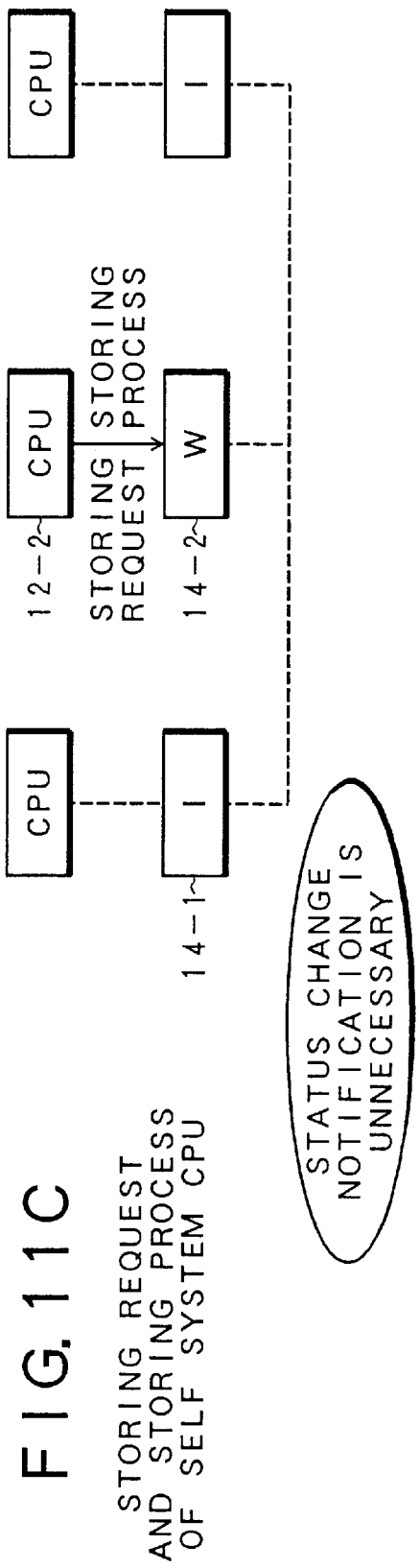
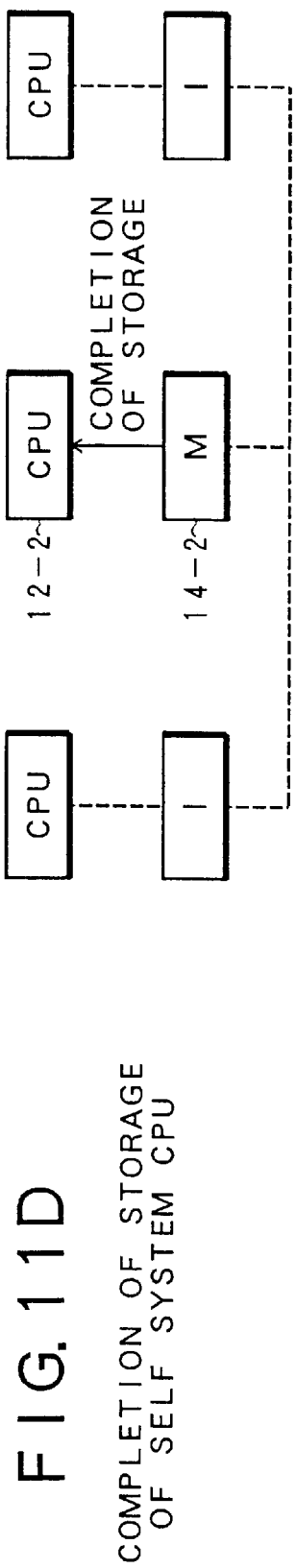
FIG. 11C
STORING REQUEST
AND STORING PROCESS
OF SELF SYSTEM CPU
FIG. 11D
COMPLETION OF STORAGE
OF SELF SYSTEM CPU

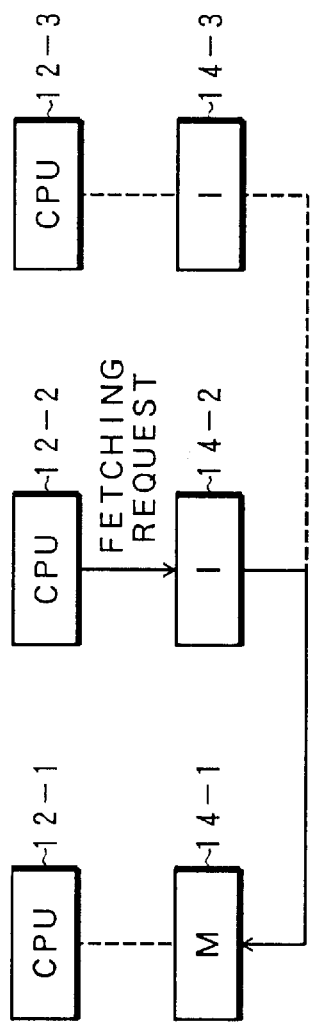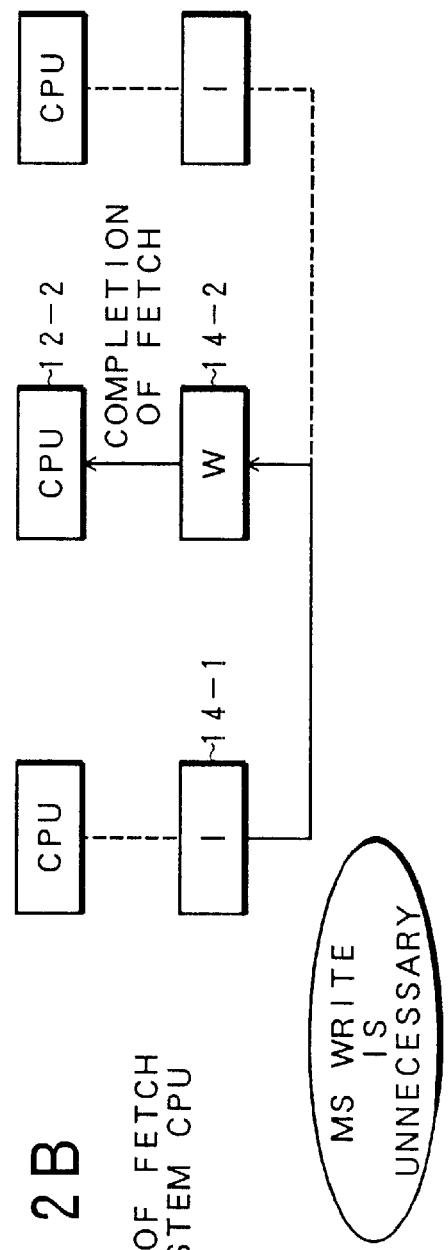
FIG. 12A
FETCHING REQUEST OF SELF SYSTEM CPU
FIG. 12B
COMPLETION OF FETCH OF SELF SYSTEM CPU

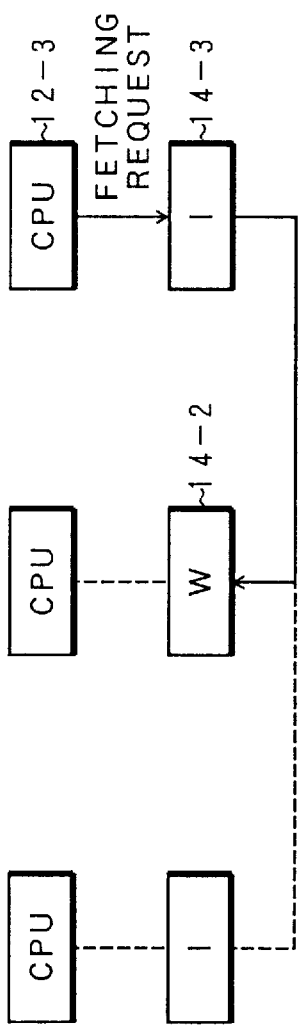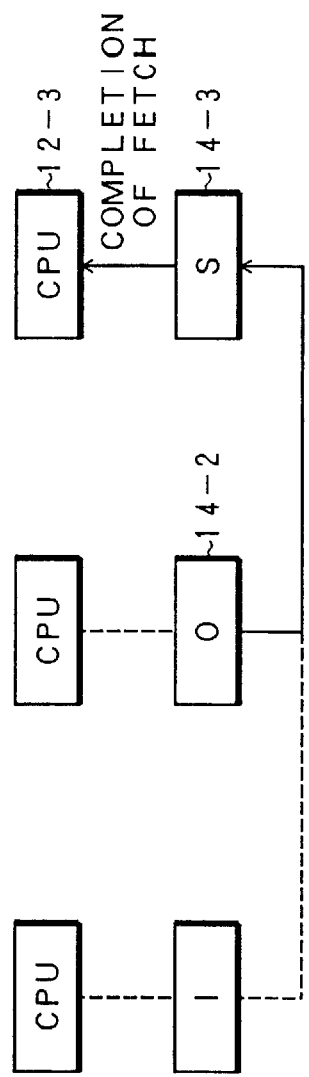
FIG. 12C
FETCHING REQUEST OF
OTHER SYSTEM CPU
FIG. 12D
COMPLETION OF FETCH
OF OTHER SYSTEM CPU

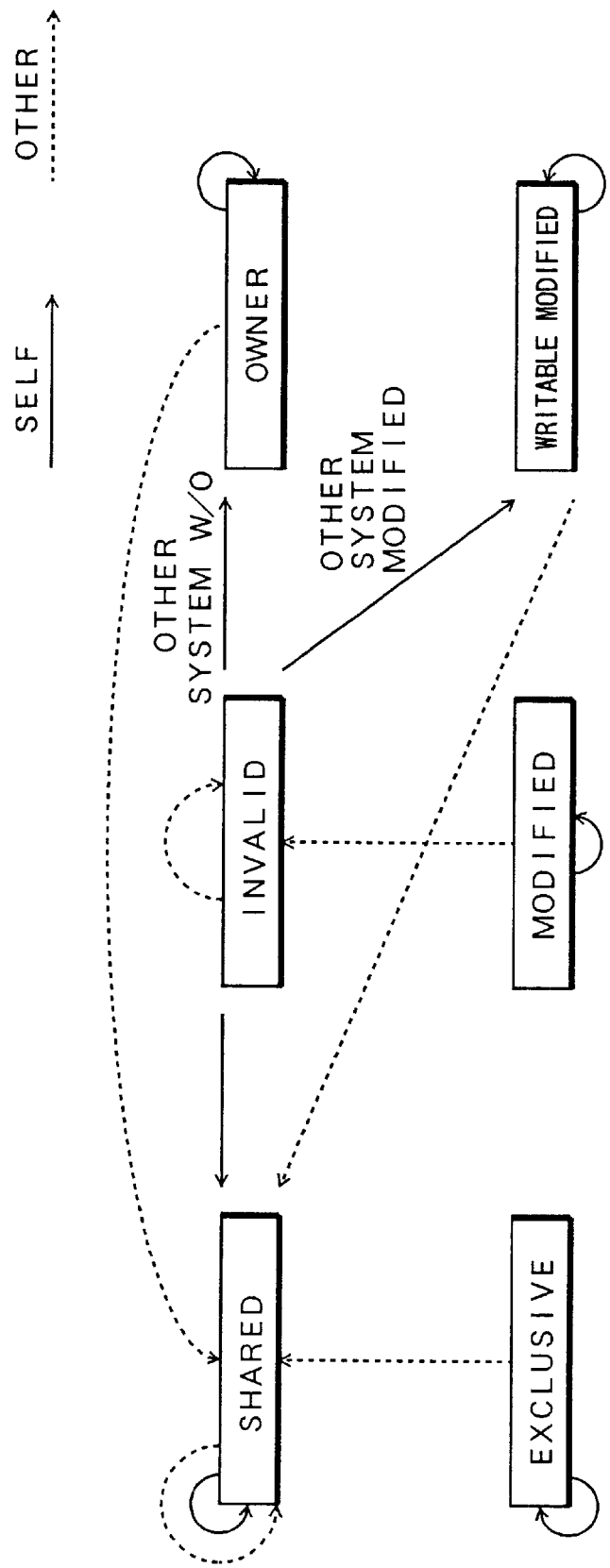
F I G. 13

FETCHING REQUEST OF SELF SYSTEM CPU

COMPLETION OF FETCH OF SELF SYSTEM CPU

MS WRITE IS UNNECESSARY

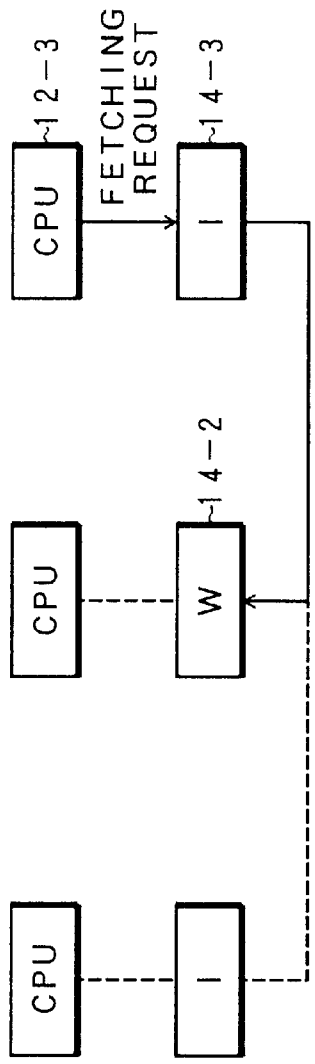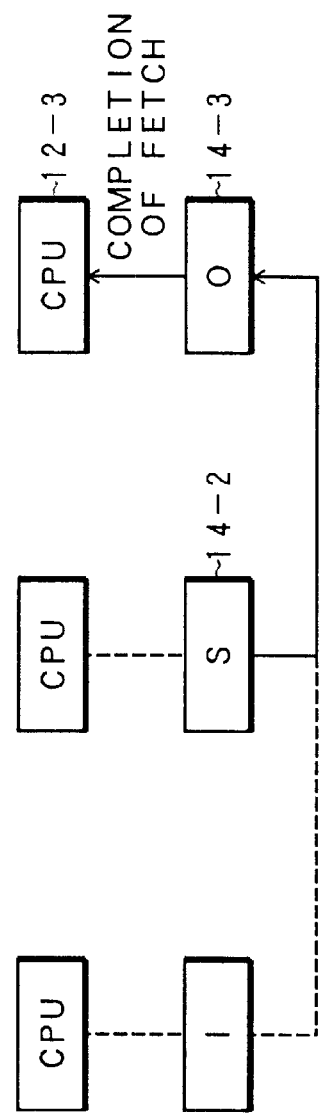
FIG. 14C
FETCHING REQUEST OF SELF SYSTEM CPU
FIG. 14D
COMPLETION OF FETCH OF SELF SYSTEM CPU

CACHE APPARATUS AND CONTROL METHOD HAVING WRITABLE MODIFIED STATE

BACKGROUND OF THE INVENTION

1. Field of the Invention

The present invention relates to a cache apparatus and a control method for managing a cache memory by a multiprocessor system and, more particularly, to a cache apparatus and a control method for increasing access performance by controlling various statuses or states of cache data.

2. Description of the Related Arts

In association with a recent demand for a high processing speed of a computer system, in a multiprocessor system, each CPU (processor) has a cache apparatus. Data in a cache provided for each CPU is managed on the cache memory every block in accordance with a rule called a cache coherence protocol to maintain matching of the data among the caches in order to maintain correctness of the data, namely, sharing and consistency of data among the caches.

As a conventional general cache protocol, an MESI cache protocol for managing four statuses or states of MESI has been known. FIGS. 1A and 1B are status transition diagrams of the conventional MESI cache protocol. FIG. 1A is a fetching protocol in case of a fetching request (reading request). FIG. 1B is a storing protocol in case of a storing request (writing request). Symbols of the status transition denote the following contents.

M: Modified. Valid data is held only in one of a plurality of caches. Data has been modified. It is not guaranteed that a value of the data is the same as that in a main storage.

E: Exclusive. Valid data is held only in one of a plurality of caches.

S: Shared. The same data is held in a plurality of caches.

I: Invalid. Data in the cache is invalid.

In the cache control using the conventional MESI cache protocol as mentioned above, if a certain CPU issues a fetching request by which a CPU of the other system refers to a data block stored in a cache apparatus, it is necessary to write the data block into the main storage MS. It requires an amount of access time corresponding to the time for such a writing operation.

FIGS. 2A to 2E show a multiprocessor system comprising CPUs 100-1 to 100-3 and cache apparatuses 102-1 to 102-3 and relate to a case where the CPU 100-2 issues a fetching request and a storing request to the same data block. FIGS. 2A and 2B first show a fetching process of the CPU 100-2. First in FIG. 2A, the CPU 100-2 issues the fetching request to the cache apparatus 102-2 of the self system. However, since the status of the data block denotes Invalid I, the CPU 100-2 issues the fetching request through a bus to the cache apparatus 102-1 in which the data block has been held in the status of Modified M. In FIG. 2B, the data block is obtained and, in response to the CPU 100-2, the status of the data block in the cache apparatus 102-2 is changed from Invalid I to Shared S. The status of the data block in the cache apparatus 102-1 on the data fetching destination side is switched from Modified M to Shared S. Further, the data block which received the fetching request is written into the main storage MS.

FIGS. 2C to 2E show a case where the CPU 100-2 subsequently issues the storing request to the same data block. As shown in FIG. 2C, when the CPU 100-2 issues the storing request to the self system cache apparatus, a block changing request is issued to the cache apparatus 102-1 of the other system holding the same data block in the status of Shared S. As shown in FIG. 2D, the status of the data block is switched from Shared S to Invalid I. The CPU 100-2 performs a storing process to store new data into a data block in the cache apparatus. When the storing process is finished, as shown in FIG. 2E, the completion of the storage is notified from the cache apparatus 102-2 to the CPU 100-2. The process is finished.

FIGS. 3A to 3D show a case where the CPUs 100-2 and 100-3 successively issue the fetching request to the same data block. First, the fetching process of the CPU 100-2 in FIGS. 3A and 3B is the same as that in FIGS. 2A and 2B. It is necessary to write the data block into the main storage MS in response to the fetching request to the cache apparatus 102-1. FIGS. 3C and 3D show the fetching process of the CPU 100-3. The data block is obtained by the fetching request to the cache apparatus 102-2 of the other system. In FIG. 3D, the completion of the fetch is notified to the CPU 100-3.

In such a conventional MESI cache protocol, however, as shown in FIGS. 2B and 3B, when the data block is obtained by issuing the fetching request to the cache apparatus of the other system, the writing operation into the main storage MS is performed in the cache apparatus 102-1 of the other system. As shown in FIG. 2C, when the CPU 100-2 allows the data block held in the status of Shared S to be stored in the cache apparatuses 102-1 and 102-2 of the self and other systems, it is necessary to switch the status of the data block from Shared S to Invalid I by issuing the block changing request (status changing request) to the cache apparatus 100-1 of the other system.

FIG. 4A is another status or state transition diagram of the fetching protocol in the conventional MESI cache protocol. Also in this case, when the data block in the status of Modified M is switched to Invalid I in response to the fetching request from the other system, the writing operation into the main storage MS is performed. FIG. 4B shows another status or state transition diagram of the fetching protocol in the conventional SEMI cache protocol. In this case, when the data block in the status of Modified M is switched to Invalid I in response to the fetching request from the other system, it is not switched to Shared S even if the fetching request is issued after that, thereby making the writing operation into the main storage MS unnecessary even if the data block is switched from Modified M to Invalid I in response to the fetching request of the other system.

To make the writing operation into the main storage MS which is performed at the time of the fetching process of the MESI cache protocol in FIG. 2A or 3A unnecessary, in JP-A-6-124240 (Japanese Patent Application No. 4-275825), as shown in FIGS. 5A and 5B, the protocol is constructed so as to show five statuses obtained by adding Shared Modified O to the MESI cache protocol, thereby making the writing operation into the main storage MS at the time of the fetching process unnecessary. Reference symbol O of Shared Modified denotes Owner.

FIGS. 6A to 6E show the multiprocessor system comprising the CPUs 100-1 to 100-3 and cache apparatuses 102-1 to 102-3 and relate to the case where the CPU 100-2 issues the fetching request and the storing request to the same data block. First, FIGS. 6A and 6B show the fetching process of the CPU 100-2.

In FIG. 6A, the CPU 100-2 issues the fetching request to the self system cache apparatus 102-2. Since the data block is in the status of Invalid I, the fetching request is issued via the bus to the cache apparatus 102-1 holding the data block in the status of Modified M. In FIG. 6B, the data block is obtained, a response is made to the CPU 100-2, and the status of the data block of the cache apparatus 102-2 is changed from Invalid I to Shared S. In this instance, the status of the data block of the cache apparatus 102-1 on the data fetching destination side is switched from Modified M to Shared Modified O. In this case, since it is not switched to Shared S, the writing operation into the main storage MS of the data block which received the fetching request is unnecessary. FIGS. 6C to 6E show the case where the CPU 100-2 issues the storing request to the same data block. As shown in FIG. 6C, when the CPU 100-2 issues the storing request to the self system cache apparatus 102-2, the block changing request (status changing request) is issued to the other system cache apparatus 100-1 holding the same data block in the status of Shared Modified O. As shown in FIG. 6D, therefore, the status of the data block is switched from Shared Modified O to Invalid I and the CPU 100-2 performs the storing process to store new data into the data block of the cache apparatus. When the storing process is finished, as shown in FIG. 6E, the completion of the storage is notified from the cache apparatus 102-2 to the CPU 100-2 and the process is finished.

FIGS. 7A to 7D show the case where the fetching request is successively issued from the CPU 100-2 and the CPU 100-3 to the same data block in this order. The fetching process of the CPU 100-2 in FIGS. 7A and 7B is the same as that in FIGS. 6A and 6B. Since the status is switched from Modified M to Shared Modified O in response to the fetching request to the cache apparatus 102-1, the writing operation into the main storage MS is unnecessary. FIGS. 7C and 7D show the fetching process of the CPU 100-3 of the other system, which is subsequently performed. The data block is fetched by the fetching request to the cache apparatus 102-2 and the completion of the fetch is notified to the CPU 100-3 in FIG. 7D. As mentioned above, in the SEMIO cache protocol having five statuses in FIGS. 5A and 5B, Shared Modified O positioning at the center between Modified M and Shared S is newly provided and stairway performance is provided for Shared. Accordingly, even if there is the fetching request of the other system to the data block in the status of Modified M, the writing operation into the main storage MS is unnecessary. In such a 5-status cache protocol, the writing operation into the main storage MS is needed only in the case where the data block in the status of Modified M or Shared Modified O is replaced in response to the storing request of the self system CPU.

Even in such a cache protocol having five statuses, however, as shown in FIG. 6C, when the storing process of the other system is performed subsequently to the self system fetching process, the status changing request to switch the status of the other system from the status of Shared Modified O to Invalid I, is needed. It takes an amount of time for the storing process corresponding to the time for the execution of the status changing request to the other system. Since a frequency of executing the storing process in the self system to the data block on the cache obtained by the fetching request of the self system is high, it would be desirable to devise an improved cache coherency protocol for improving the access performance of the whole apparatus.

SUMMARY OF THE INVENTION

According to the invention, a cache apparatus and a control method in which accessing performance to a cache can be raised by reducing requests for a status change to other systems by finely dividing a status to manage a data block on the cache are provided.

The invention provides a cache apparatus each of which is provided within a microprocessor system having a storage device. The cache apparatus of the invention comprises a cache memory and a cache controller. The cache memory stores data from the storage device and information indicative of a status of the data. The cache controller controls the cache memory in a Writable Modified state for allowing sharing performance to be possessed step by step in a case where there is a fetching request. The cache controller expresses the data state by one of the following six states:

Invalid state;
Shared state;
Exclusive state;
Modified state;
Shared Modified state; and
Writable Modified state; in, for example, a fetching protocol and controls the cache memory.

As a self apparatus fetching process for forming the Writable Modified state, in the case where the cache apparatus obtains data in a Modified state from another cache apparatus in response to the fetching request from a CPU of the self apparatus to data in an Invalid state, the cache controller of the cache apparatus changes the Invalid state of the obtained data to the Writable Modified state. At the same time, when a fetching request is received from the other apparatus with respect to the data in the Modified state, the self apparatus switches the state of the data from the Modified state to the Invalid state. By such conditions, the sixth Writable Modified state added in the invention is formed. As a self apparatus storing process after the Writable Modified state is formed, the cache controller of the cache apparatus stores the data in response to a storing request to the data in the Writable Modified state from the self apparatus CPU and, thereafter, switches the Writable Modified state of the data to the Modified state without needing to modify the other apparatus of the state change. The cache apparatus of the invention as mentioned above finely divides the state of the data to be managed on the cache, thereby reducing the number of state changing requests to the other apparatus and, consequently, raising the accessing speed to the cache apparatus.

In a multiprocessor system having a cache apparatus of a store-in system, it is known that in the case where the CPU of the other apparatus fetches the data stored by a certain CPU, a probability that the CPU of the other apparatus stores the data into the same data is high. It is also known that in the case where the CPU of the other apparatus fetches without storing the data into such data, the Shared state continues. This can be also presumed from the fact that in the case where a plurality of CPUs refer to the same data, if this data lies in a mere reference region, the storing operation is not performed. If it lies in a control region such that the data storage is performed, there is a possibility that the storing operation is also executed by the CPU of the other apparatus. By using such a nature, according to the invention, a 6-state construction in which a Writable Modified state is further added to the conventional five states, is formed and the data of the Writable Modified state is enabled to solely store the data without sharing it with the other apparatus. In the case where the CPU issues the storing request subsequently to the fetching request, therefore, according to the cache protocol of five states, although it is necessary to request a state change to the other apparatus, according to the cache protocol of six states of the invention, the data can be stored without needing to modify the other apparatus of the state. As bits which are necessary to express six states, they can be expressed by three bits in a manner similar to the case of five states. Also in the case where there is not storing request but there is a fetching request from the other apparatus, it is possible to cope with such a case in a manner similar to the case of the cache protocol of five states, without increasing the number of requesting times.

The cache controller of the cache apparatus executes either of the two following different processes as a self apparatus fetching process after the Writable Modified state is formed.

(First Self Apparatus Fetching Process)

As a first self apparatus fetching process, in the case where a fetching request is received to the data in the Writable Modified state from the other apparatus in which the data is in the Invalid state, the cache controller of the cache apparatus switches the Writable Modified state of the data to the Shared Modified state (there is no transfer of the owner). In the case where the data in the Writable Solidified state is obtained from the other apparatus in response to the fetching request to the data in the Invalid state from the CPU of the self apparatus, the cache controller of the cache apparatus switches the Invalid state of the obtained data to the Shared state. In this case, if the fetching request is received for the data in the Shared Modified state from the CPU of the self apparatus, the cache controller of the cache apparatus maintains the Shared Modified state and does not transfer the owner.

(Second Self Apparatus Fetching Process)

As a second self apparatus fetching process, in the case where a fetching request is received for the data in the Writable Modified state from the other apparatus in which the data is in the Invalid state, the cache controller of the cache apparatus switches the Writable Modified state of the data to the Shared state. In the case where the data in the Writable Modified state is obtained from the other apparatus in response to the fetching request for the data in the Invalid state from the CPU of the self apparatus, the cache controller of the cache apparatus switches the Invalid state of the obtained data to the Shared Modified state (transfer of the owner). In this case, if the fetching request is received for the data in the Shared Modified state from the CPU of the self apparatus, the cache controller of the cache apparatus maintains the Shared Modified state. In the case where the fetching request is received for the data in the Shared Modified state from the other apparatus, the cache controller switches the Shared Modified state of the data to the Shared state (transfer of the owner). Further, in the case where the data in the Shared Modified state is obtained from the other apparatus in response to the fetching request from the CPU of the self apparatus for the data in the Invalid state, the cache controller switches the Invalid state of the obtained data to the Shared Modified state.

As a storing process of the Shared Modified state corresponding to the first and second self apparatus fetching processes, in the case where a storing request is received for the data in the Shared Modified state from the CPU of the self apparatus, the cache controller of the cache apparatus stores the data and thereafter, switches the Shared Modified state of the data to the Modified state. In the case where a state changing request based on the storing request from the other apparatus is received for the data in the Shared Modified state, the cache controller switches the Shared Modified stated of the data to the Invalid state.

The invention provides a method of controlling a cache memory. The control method comprises the operations of: storing data from a storage device into the cache memory information indicative of a status of the data; and controlling the cache memory in a Writable Modified state for allowing sharing performance to be possessed step by step in a case where there is a fetching request.

For example, in a fetching protocol, the state of data is expressed by six states including the Writable Modified state for allowing the sharing performance to be possessed step by step in a case where there is a fetching request, in addition to the Invalid state, Shared state, Exclusive state, Modified state, and Shared Modified state, thereby controlling the cache memory.

As a fetching process for the Shared Modified state formed by the first fetching process, in the case where the fetching request is received for the data in the Shared Modified state from the CPU of the self apparatus or the other apparatus, the Shared Modified state is maintained. As a second fetching process after the Writable Modified state is formed, in the case where a certain cache apparatus receives the fetching request for the data in the Writable Modified state from the other apparatus in which the data is in the Invalid state, the cache apparatus switches the Writable Modified state of the data to the Shared state. The other apparatus switches the Invalid state of the obtained data to the Shared Modified state. As a fetching process for the Shared Modified state formed by the second fetching process, in the case where the fetching request is received for the data in the Shared Modified state from the CPU of the self apparatus, the Shared Modified state is maintained. In the case where the fetching request is received for the data in the Shared Modified state from the other apparatus, the Shared Modified state of the data is switched to the Shared state. As a storing process corresponding to the first and second fetching processes, in the case where the storing request is received for the data in the Shared Modified state from the CPU of the self apparatus, the data is stored and, thereafter, the Shared Modified state of the data is switched to the Modified state. In the case where the state change notification based on the storing request is received for the data in the Shared Modified state from the other apparatus, the Shared Modified state of the data is switched to the Invalid State.

Further, according to the invention, there is provided a multiprocessor system comprising: a storage device; a plurality of processing modules connected to the storage device, each processing module having: a cache memory for storing data from the storage device and information indicative of a status of the data; and a cache controller for controlling the cache memory in a Writable Modified state for allowing sharing performance to be possessed step by step in a case where there is a fetching request.

The above and other objects, features, and advantages of the present invention will become more apparent from the following detailed description with reference to the drawings.

BRIEF DESCRIPTION OF THE DRAWINGS

FIGS. 2A to 2E are explanatory diagrams of a caching process in the case where the storing operation of the self system is performed subsequently to the fetching operation of the self system by the conventional 4-status cache protocol;

FIGS. 3A to 3D are explanatory diagrams of a caching process in the case where the fetching operation of the other system is performed subsequently to the fetching operation of the self system by the conventional 4-status cache protocol;

FIGS. 5A and 5B are explanatory diagrams of a status transition in a conventional 5-status cache protocol;

FIGS. 6A to 6E are explanatory diagrams of a caching process in the case where the storing operation of the self system is performed subsequently to the fetching operation of the self system by the conventional 5-status cache protocol;

FIGS. 7A to 7D are explanatory diagrams of a caching process in the case where the fetching operation of the other system is performed subsequently to the fetching operation of the self system by the conventional 5-status cache protocol;

FIG. 9 is a block diagram of a functional construction of a cache apparatus of the invention;

FIGS. 11A to 11D are explanatory diagrams for a caching process of the invention in the case where the storing operation of the self system is performed subsequently to the formation of the status of Writable Modified W by the fetching operation of the self system;

FIGS. 12A to 12D are explanatory diagrams of a caching process of the invention in the case where the fetching operation of the other system is performed subsequently to the formation of the status of Writable Modified W by the fetching operation of the self system;

FIG. 13 is an explanatory diagram of another status transition for a fetching request in a 6-status cache protocol of the invention; and FIGS. 14A to 14D are explanatory diagrams of a caching process of the invention in the case where the storing operation of the self system is performed in accordance with the status transition in FIGS. 7A to 7D subsequently to the formation of the status of Writable Modified W by the fetching operation of the self system.

DETAILED DESCRIPTION OF THE PREFERRED EMBODIMENT

Figure 8:
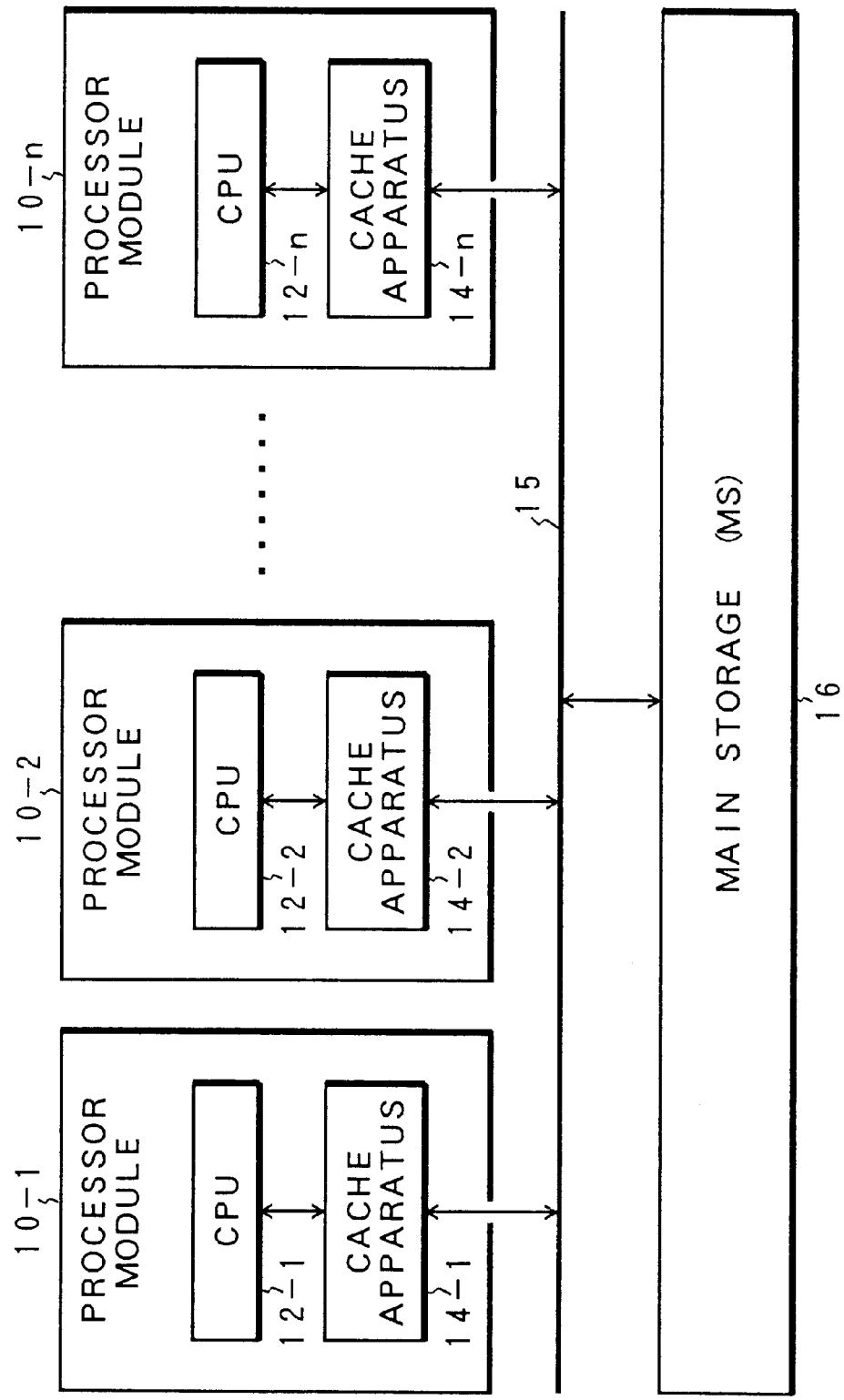
FIG. 8 is a block diagram of a multiprocessor system to which the invention is applied.

FIG. 8 is a block diagram of a multiprocessor system to which a cache apparatus and a control method according to the invention are applied. The multiprocessor system has a plurality of processor modules 10-1, 10-2, . . . , and 10-n. CPUs (processors) 12-1 to 12-n and cache apparatuses 14-1 to 14-n are provided for each of the processor modules 10-1 to 10-n. The cache apparatuses 14-1 to 14-n are mutually connected by a system bus 15 and further connected to a main storage 16 by the system bus 15. For example, a snoop bus is used as a system bus 15 to connect the cache apparatuses 14-1 to 14-n. The snoop bus is a bus such that when a fetching or storing processing request is issued from the CPUs 12-1 to 12-n in one of the cache apparatuses 14-1 to 14-n, a status of a data block held on a cache line corresponding to such a processing request can be immediately obtained by a status signal of a snoop control line.

FIG. 9 is a functional block diagram of a cache apparatus 10 of the invention. The cache apparatus 10 is constructed by a cache controller 18 and a cache memory 20. The cache memory 20 hold data on a unit basis for a plurality of cache lines 22. Each cache line 22 includes a tag 24 and a data block 30. The tag 24 has a status tag 26 and an address tag 28. With respect to the status tag 26 in the cache memory 20, in the invention, the status of the data block is expressed by one of six statuses including Writable Modified W for allowing sharing performance to be possessed step by step in the case where there is a fetching request of the self system, in addition to five statuses such as Invalid I, Shared S, Exclusive E, Modified M, and Shared Modified O, and the cache memory 20 is managed. The cache controller 18 comprises: a cache control managing unit 32; a status managing unit 34; a processor interface 36; and a bus interface 38. The status managing unit 34 comprises a fetching protocol processing unit 40 and a storing protocol processing unit 42.

When the fetching request is received from a CPU 12, the cache control managing unit 32 searches the cache line 22 having the address tag 28 in which a request address and an address value coincide with reference to the tag 24 in the cache memory 20. When the cache line in which the address coincides does not exist, it means that there is a cache miss, and a data block is obtained from the main storage 16 or another cache apparatus and sent to the CPU 12. When the cache line of the address which coincides with the request address exists, the cache control managing unit 32 executes a process corresponding to the status of Invalid I, Shared S, Exclusive E, Modified M, Shared Modified O, or Writable Modified W according to the status tag 26 of the cache line. In response to the storing request from the CPU 12, if there is a cache hit, the cache control managing unit 32 performs a storing process to update the data block of the relevant cache line in the cache memory 20. If there is a miss hit, the cache control managing unit 32 performs a storing process to hold a new cache line in the cache memory 20 and write data there. In this instance, if the relevant data block exists in another cache apparatus, the cache control managing unit 32 performs a storing process to write data after the latest data block was obtained from the other cache apparatus. In response to such a processing request from the other cache apparatus via the CPU 12 and system bus 15 by the cache control managing unit 32, a status transition control of the status tag 26 on the relevant cache line is executed after the status managing unit 34 executed the processing request. As a status transition control for cache coherence by the status managing unit 34, in the invention, in the case where the fetching request of the self system is further issued for the cache protocol of five statuses of the conventional MESIO shown in FIGS. 5A and 5B, a cache protocol of six statuses of MESIOW to which Writable Modified W for allowing sharing performance to be possessed step by step is added is applied.

Figure 10A:
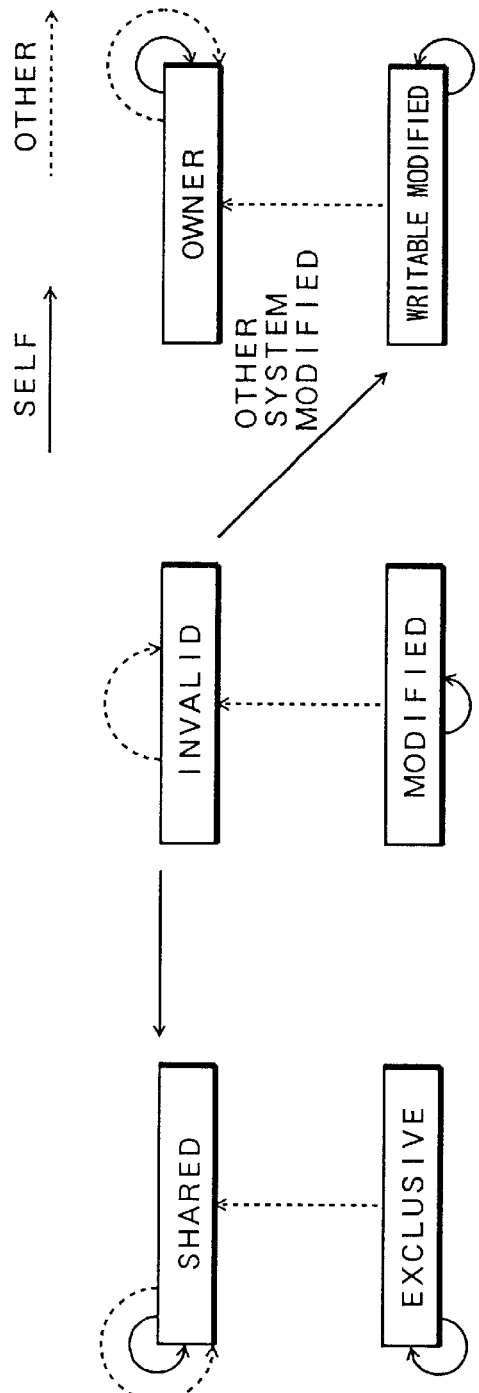
FIGS. 10A and 10B are explanatory diagrams of a status transition in a 6-status cache protocol of the invention.
Figure 10B:
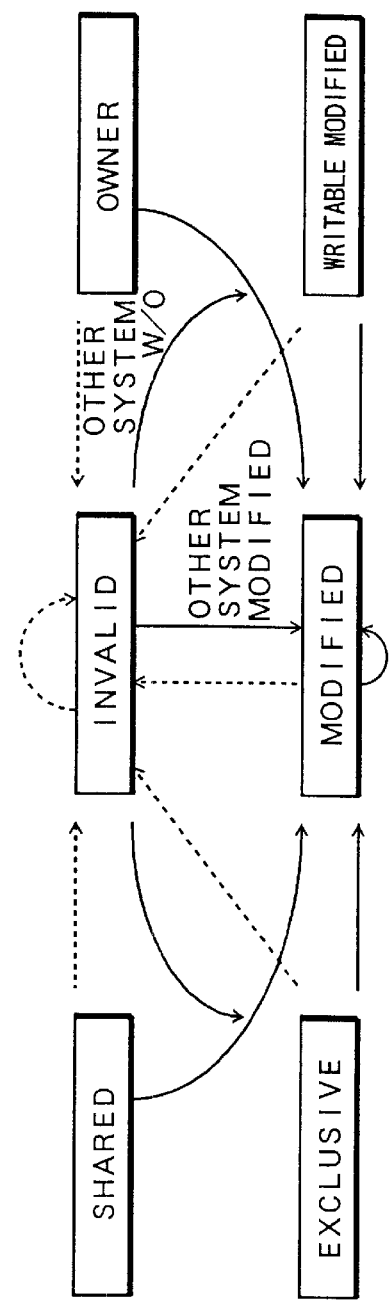

FIGS. 10A and 10B are explanatory diagrams of a status transition in a 6-status cache protocol of MESIOW which is used in the status managing unit 34 in FIG. 9. That is, FIG. 10A shows a status transition in the MESIOW fetching protocol responsive to the fetching request which is processed by the fetching protocol processing unit 40. FIG. 10B shows a status transition in the MESIOW storing protocol by the storing protocol processing unit 42 in FIG. 9. An arrow having a solid line in the diagram shows the transition in the case where there is a fetching request or storing request from the self system CPU in the relevant status. An arrow having a broken line shows the transition in the case where a fetching request or storing request has been processed by the cache apparatus of the other system. It is a feature of the 6-status cache protocol according to the invention that the status of Writable Modified W for allowing the sharing performance to be possessed step by step is added to the 5-status cache protocol shown in FIGS. 5A and 5B.

Therefore, it will be understood that the status of Writable Modified W is newly added when the 6-status fetching protocol according to the invention in FIG. 10A is compared with the 5-status fetching protocol in FIG. 5A. Accordingly to the transition to the status of Writable Modified W, in response to a fetching request from the self system CPU, when the data block in its own cache memory is Invalid I and the data block corresponding to the other cache apparatus exists in the status of Modified M, the relevant data block is obtained from the other cache apparatus and sent to the system CPU. In a state after completion of such a self system fetching process, I. the status of the data block of the cache apparatus on the obtaining destination side is switched from Modified M to Invalid I, and II. the status of the obtained data block is switched from Invalid I to Writable Modified W as provided newly in the invention.

The transition status to form Writable Modified W corresponds to the portion where the status has been changed from Invalid I to the status of Writable Modified W under the condition that the status of the data block of the other system is Modified M as shown by an arrow of a solid line in FIG. 10A. With respect to the status of the data block after the data is obtained from the cache of the other system in response to the fetching request, such a transition status corresponds to the portion where the status of the data block of the cache of the other system has been changed from Modified M to Invalid I as shown by a broken line. When comparing the 6-status fetching protocol in FIG. 10A with the 5-status fetching protocol in FIG. 5A, in the 6-status fetching protocol, since the status of Writable Modified W is newly added, the transition to Shared Modified O is performed via the added status of Writable Modified W. In the case where the data block of the cache line is set to the status of Writable Modified W in accordance with the fetching protocol in FIG. 10A, in response to the storing request from the self system CPU according to the storing protocol in FIG. 10B, the storing process can be completed only by the cache apparatus in the status of Writable Modified W without needing to request the status change to the other cache apparatus. Even in the storing protocol in FIG. 10B, Writable Modified W for allowing the sharing performance to be possessed is newly added step by step to the 5-status storing protocol shown in FIG. 5B. Therefore, after the data block of the cache line was set to writable modified W in accordance with the 6-status fetching protocol in FIG. 10A, when the storing request of the self system CPU is completed, the status of the data block of the cache line is changed from Writable Modified W to Modified M. In the case where the data block in Writable Modified W becomes a target of the storing request in the cache apparatus of the other system, the status is changed from Writable Modified W to Invalid I as shown by a broken line. Further, when the data block as a storage target is obtained in the status of Invalid I from the cache apparatus of the other system, if the status of the data block of the other system is the status of Writable Modified W or Shared Modified O, the data block is obtained from the cache of the other system and, in a state where the storing process has been completed, the status is changed from Invalid I to Modified M. The other points are substantially the same as those in the status transition in the 5-status storing protocol in FIG. 5B.

Figure 1A:
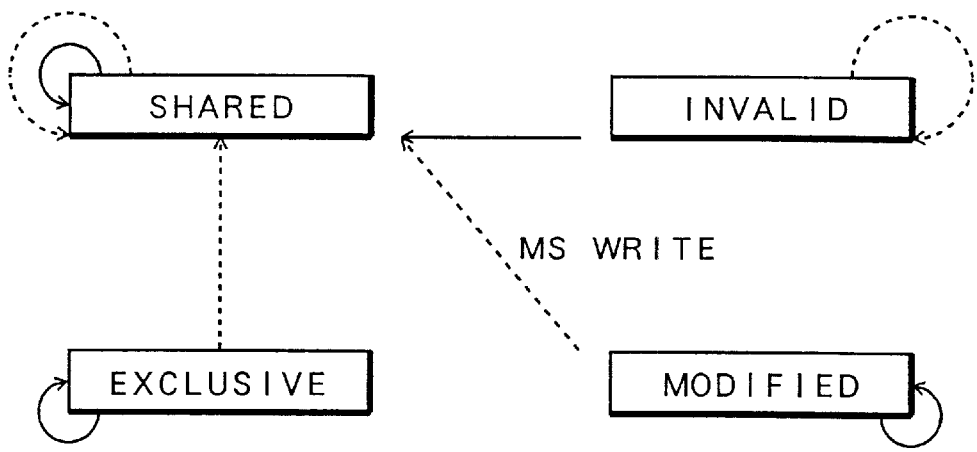
FIGS. 1A and 1B and explanatory diagrams of a status or state transition in a conventional 4-status cache protocol.
Figure 1B:
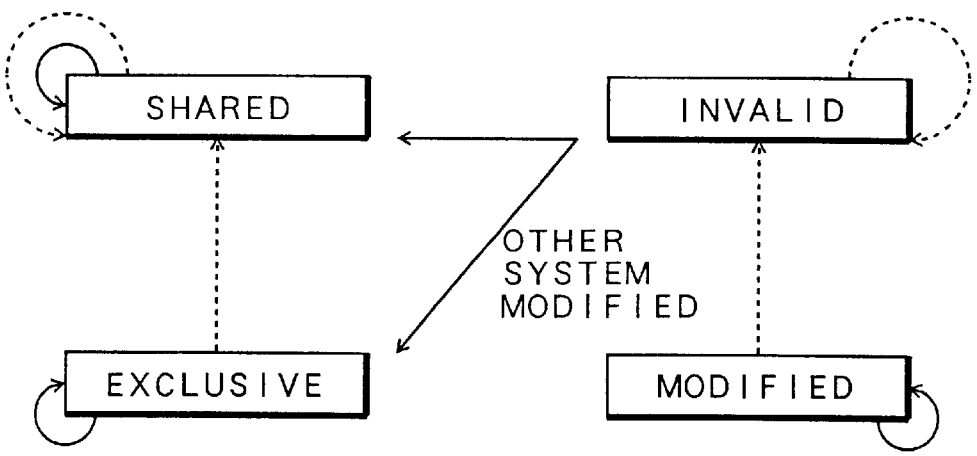
Figure 2C:
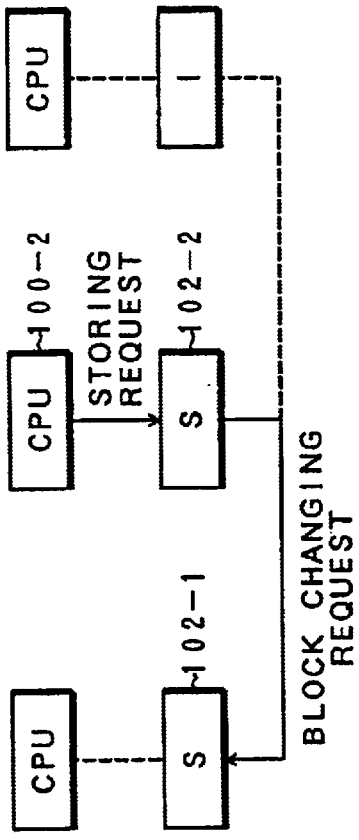
Figure 2D:
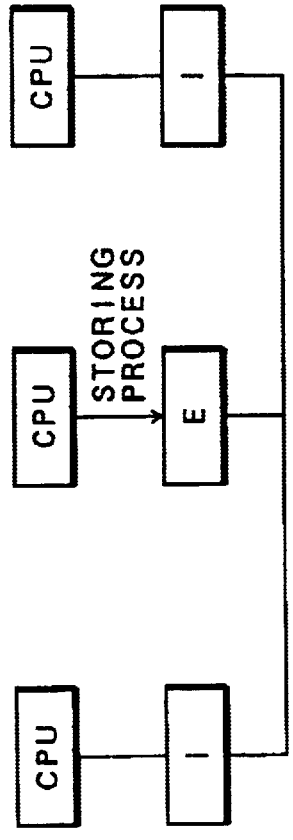
Figure 2E:
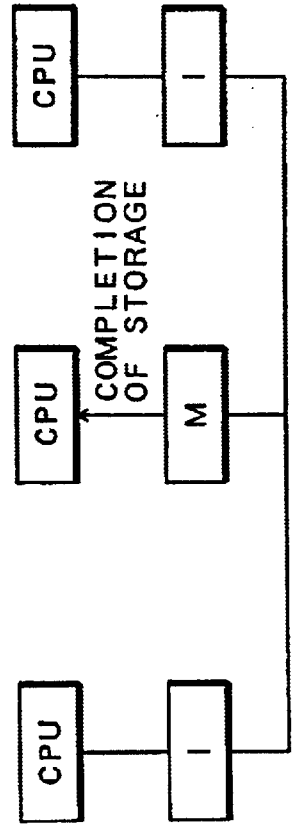
Figure 3C:
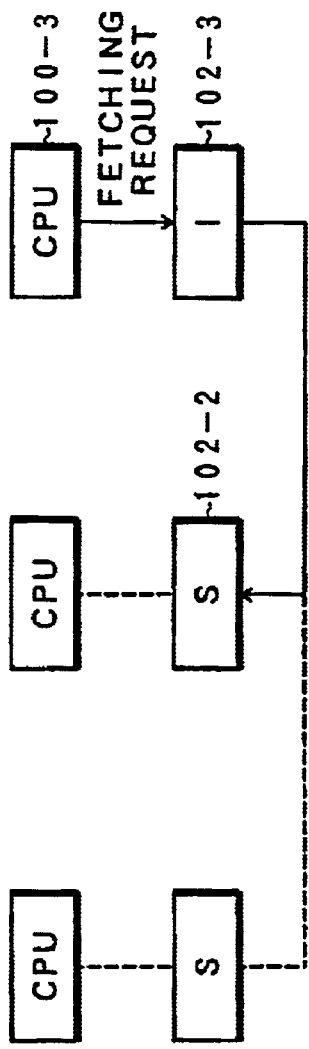
Figure 3D:
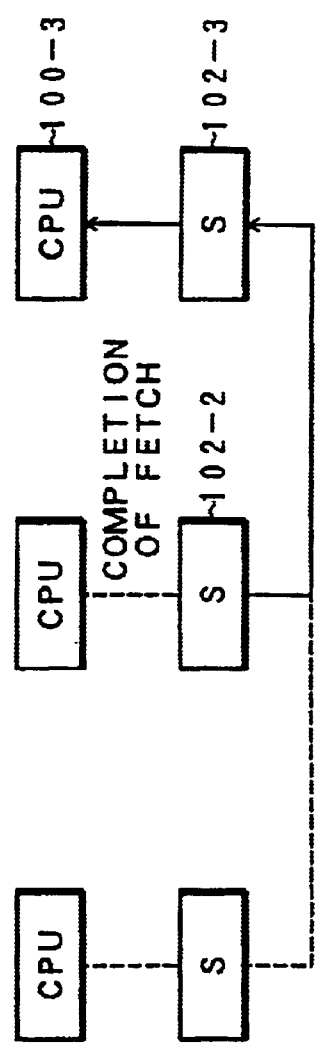
Figure 4A:
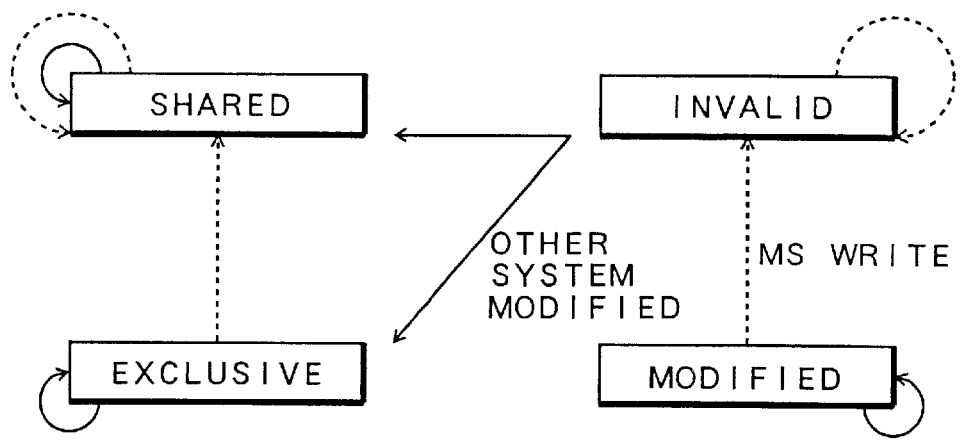
FIGS. 4A and 4B are explanatory diagrams of another status transition for the fetching request in the conventional 4-status cache protocol.
Figure 4B:
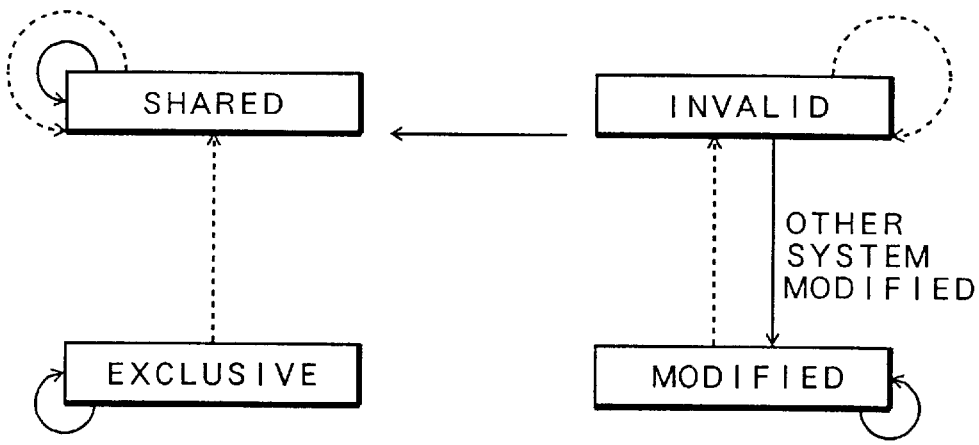
Figure 6C:
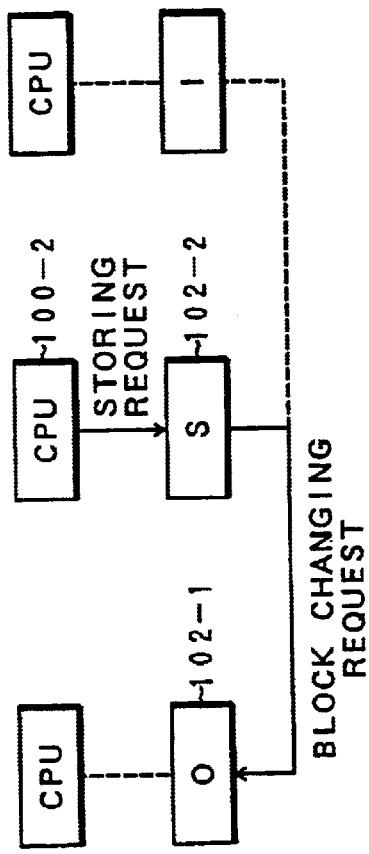
Figure 6D:
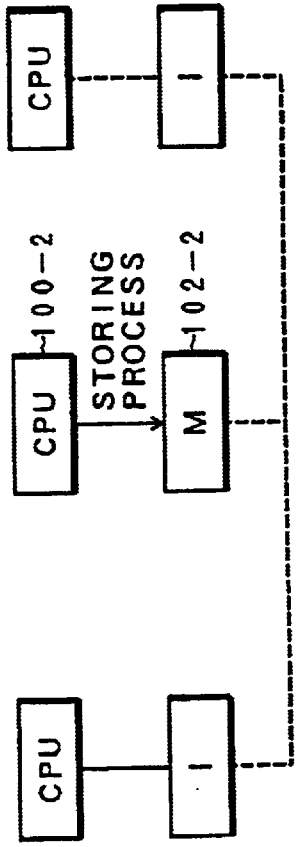
Figure 6E:
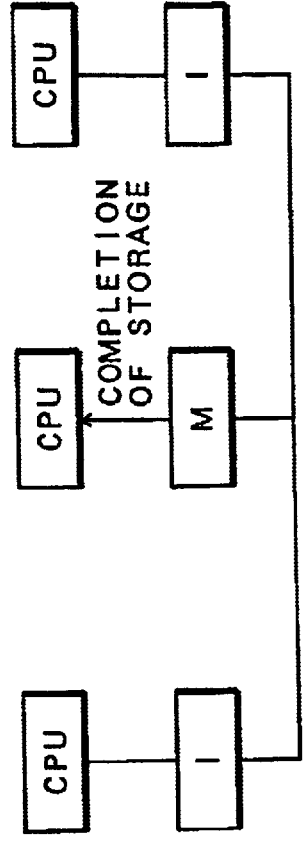
Figure 7C:
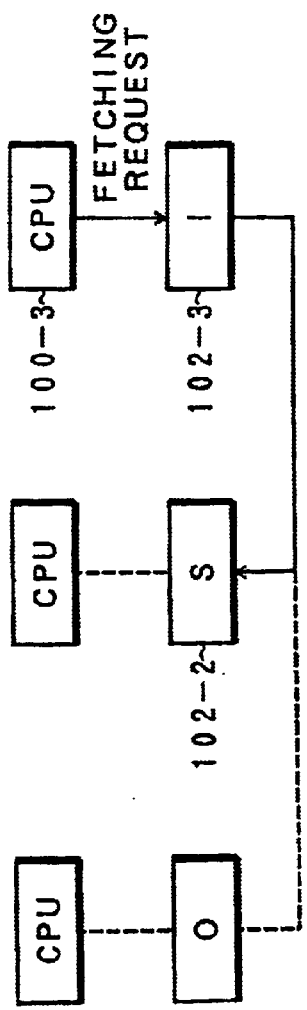
Figure 7D:
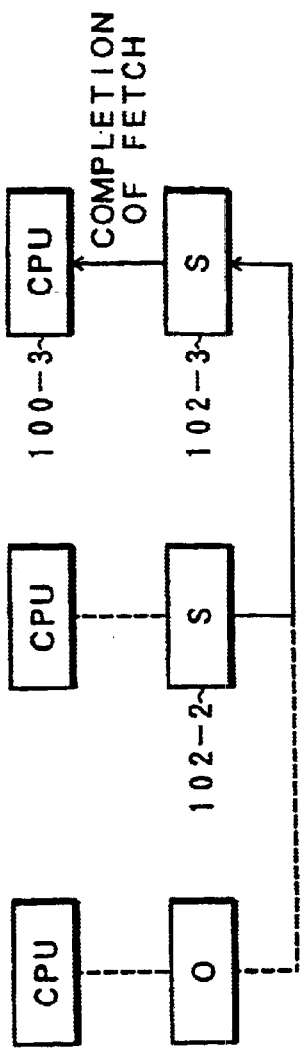

FIGS. 11A to 11D are explanatory diagrams showing the status transition of Writable Modified W by the fetching request of the self system and the subsequent status transition by the storing process of the self system with respect to the 6-status cache protocol of SEMIOW of the invention in the case of an example of three CPUs 12-1, 12-2, and 12-3 and three cache apparatuses 14-1, 14-2, and 14-3 provided for the three processor modules in the multiprocessor system in FIG. 8, respectively. FIG. 11A shows the status of the relevant data block when the CPU 12-2 located at the center issues the fetching request to the cache apparatus 14-2. The cache apparatus 14-1 is Modified M and the cache apparatus 14-2 and 14-3 are Invalid I, respectively. In the following description of the cache process, attention is paid to the CPU 12-2 locating at the center, the fetching request or storing request from the CPU 12-2 is referred to as a self system fetching request or a self system storing request, and the fetching request or storing request from the CPU 12-1 or 12-3 is referred to as another system fetching request or another system storing request. FIG. 11A shows the fetching request from the self system CPU by the CPU 12-2. Since the status of the relevant data block is Invalid I, the cache apparatus 14-2 which received the fetching request issues the fetching request to the cache apparatus 14-1 holding the relevant cache line as being Modified M. Subsequently, as shown in FIG. 11B, the cache apparatus 14-1 which received the fetching request from the cache apparatus 14-2 transfers the relevant data block to the requesting source. By responding to the CPU 12-2, the fetching operation is completed. By the completion of the fetching operation, the status of the data block of the cache apparatus 14-1 on the obtaining destination side is switched from Modified M to Invalid I. In the cache apparatus 14-2 which obtained the data block, the status is switched from Invalid I to Writable Modified W newly added in the invention. In the conventional 4-status fetching protocol shown in FIG. 1A, although it is necessary to write the data into the main storage MS at the time of transition from the status M of the cache apparatus 14-1, according to the 6-status cache protocol of the invention, the writing operation into the main storage, namely, the MS write is unnecessary with respect to the transition from Modified M in a manner similar to the 5-status cache protocol in FIGS. 5A and 5B.

Subsequently, as shown in FIG. 1C, it is assumed that the same CPU 12-2 issues the storing request to the same data block subsequently to the fetching request. In this instance, the status of the data block as a target of the storing request is Writable Modified W and, in the other cache apparatuses 14-1 and 14-3, both of the relevant data blocks are Invalid I. Therefore, the storing process for solely writing the data from the CPU 12-2 into the cache apparatus 14-2 is performed without needing to notify the other cache apparatuses 14-1 and 14-3 of the status change. After completion of the storing process in FIG. 11D, the status of the data block stored in the cache apparatus 14-2 is switched from Writable Modified W to Modified M. On the other hand, in the self system storing request after the self system fetching request was issued in the 5-status cache protocol shown in FIGS. 6C to 6F, since both statuses of the relevant data blocks of the self system and the other system are Shared S, the status changing request (block changing request) has to be issued to the other cache apparatuses in response to the storing request. In the 6-status cache protocol of the invention, consequently, with respect to the self system storing process subsequent to the self system fetching process, since the data block is Writable Modified W, there is no need to notify the other cache apparatuses of the status change, and the accessing speed of the cache can be raised in correspondence to it.

FIGS. 12A to 12D are explanatory diagrams of the caching process in the case where the other system fetching request is issued subsequently to the self system fetching request in which the status is switched to Writable Modified W with respect to the three CPUs 12-1 to 12-3 and cache apparatuses 14-1 to 14-3 as an example in a manner similar to FIGS. 11A to 11D. FIGS. 12A and 12B are the same as FIGS. 11A and 11B and in response to the fetching request of the self system of the CPU 12-2 to the cache apparatus 14-2, by obtaining the data block from the other cache apparatus 14-1 and responding, the status of the data block of the cache apparatus 14-1 on the obtaining destination side is switched from Modified M to Invalid I and the data block of the cache apparatus 14-2 of the requesting source is switched from Invalid I to Writable Modified W. Subsequently, as shown in FIG. 12C, the fetching request is issued from the other CPU 12-3 to the cache apparatus 14-3 and since the relevant data block is Invalid I, the fetching request is issued to the cache apparatus 14-2 holding the data block in the status of Writable Modified W. In response to this fetching request, as shown in FIG. 12D, the relevant data block is sent from the cache apparatus 14-2 to the cache apparatus 14-3 on the requesting source side and sent to the CPU 12-3, and the fetching process is completed. After completion of the fetching process, in the cache apparatus 14-2 on the transferring source side of the data block, the status is switched from Writable Modified W to Shared Modified O. In the cache apparatus 14-3 on the requesting source side which obtained the data block, the status is changed from Invalid I to Shared S. The process by the other system fetch after the self system fetch is performed in substantially the same procedure as that in case of the conventional 5-status cache protocol shown in FIGS. 7A to 7D, and even in case of setting six statuses obtained by newly adding Writable Modified W in the invention, the procedure for the caching process of the other system fetch subsequent to the self system fetch can be made identical without increasing any processing steps.

FIG. 13 is an explanatory diagram of a status transition in another embodiment of the fetching protocol in the 6-status cache protocol according to the invention shown in FIG. 10B. In the status transition of the 6-status fetching protocol, the transition of the cache data in the status of Writable Modified W in the case where the other system fetch is performed subsequently to the self system fetch is set to Shared Modified O as shown in FIG. 12D in the fetching protocol in FIG. 10A. However, the embodiment is characterized in that it is set to Shared S and the data block transferred to the fetch requesting source is set to Shared Modified O. That is, in the fetching protocol in FIG. 10A, in the case where the self system fetching request and the other system fetching request are successively issued, the status is changed from Writable Modified W to Shared Modified O. In the fetching protocol in FIG. 13, however, the status is changed from Writable Modified W to Shared S and, on the contrary, the requesting source which obtained the data block from the cache apparatus in Writable Modified W is changed from Invalid I to Shared Modified O.

Figure 14A:
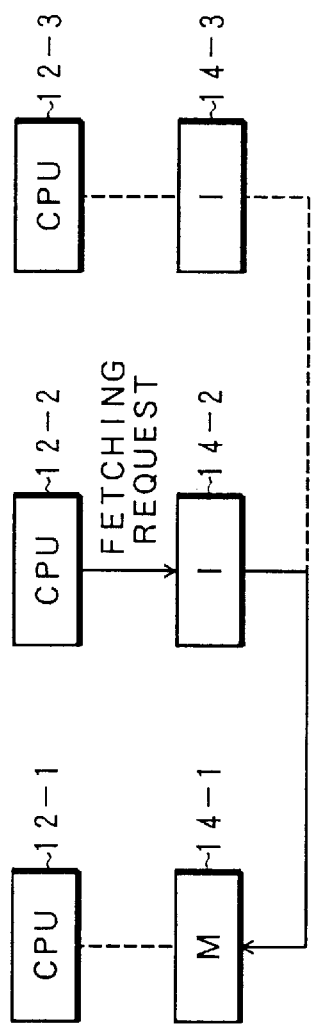
Figure 14B:
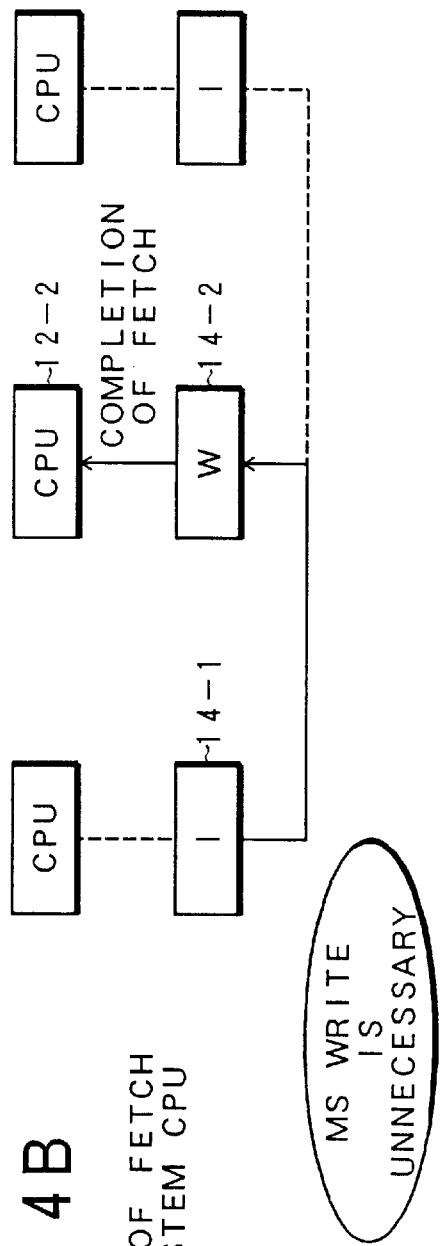

FIGS. 14A to 14D are explanatory diagrams of the caching process in the case where the other system fetch is processed subsequently to the self system fetch according to the fetching protocol in FIG. 13. The self system fetching processes in FIGS. 14A and 14B are the same as those in FIGS. 12A and 12B. The other system fetching processes in FIGS. 14C and 14D differ from those in FIGS. 12C and 12D. In FIG. 12D, the status of the cache apparatus 14-2 on the request destination side is switched from Writable Modified W to Shared Modified O and the status of the cache apparatus 14-3 on the requesting source side is switched from Invalid I to Shared S. However, in FIGS. 14C and 14D, on the contrary, the status of Writable Modified W of the cache apparatus 14-2 on the requesting source side is set to Shared S and the status of Invalid I of the cache apparatus 14-3 on the requesting source side is set to Shared Modified O. That is, in the fetching protocol in FIG. 10A, so long as the other system fetching request continues as shown in FIG. 12D, the cache apparatus 14-2 on the request destination side continues the status of Shared Modified O. Even if the other system fetch continues, since the cache apparatus in Shared Modified O is fixed, the number of status changing requests to the other cache apparatuses responsive to the other system fetching request can be reduced. On the other hand, in the fetching protocol in FIG. 13, when the other system fetching request continues as shown in FIG. 14D, the status of Shared Modified O successively moves to the requesting sources and there is less chance of receiving the storing requests as compared with that in the case where the cache apparatus is fixed to Shared Modified. Therefore, such a protocol is effective in the case where the user wants to continue the Shared status for a long time. Obviously, a selection about whether the fetching protocol in FIG. 10A is used or the fetching protocol in FIG. 13 is used can be properly set as necessary. For example, it is also possible to provide both the fetching protocol in FIG. 10A and the fetching protocol in FIG. 13, select the fetching protocol of a higher accessing speed by operation tests, a simulation, or the like, and dynamically use it.

According to the invention as described above, the status of the data block is expressed by six statuses obtained by adding the status of Writable Modified for allowing the sharing performance to be possessed step by step in the case where there is the fetching request to the five statuses of Invalid, Shared, Exclusive, Modified, and Shared Modified and the cache control is made. Therefore, in the case where the data block in the Modified status of the other cache apparatus is obtained in response to the self system fetching request and set into the Writable Modified status, and thereafter, the self system storing request is received, the storing process can be completed solely by the cache apparatus in the Writable Modified status without needing to issue the status changing request to the other cache apparatus, so that the cache accessing speed can be further raised.

Even in case of the six statuses in which Writable Modified has been newly added, if there is the other system fetching request from the other CPU subsequently to the self system fetching request in which the data block is changed to Writable Modified, it is possible to cope with such a case without increasing the number of steps of the operating procedure for the other system fetching request and a deterioration of the accessing performance due to the 6-status construction is not caused.

The invention incorporates proper modifications without losing its objects and advantages. The invention is not limited by the numerical values shown in the above embodiment.

What is claimed is:

1. An apparatus within a multiprocessor system having a storage device, said apparatus comprising:
   a cache memory storing data from the storage device and information indicative of a status of the data; and
   a cache controller controlling said cache memory in which the data has the status of a Writable Modified state and allowing sharing performance to be possessed step by step in response to a fetching request, said cache controller further controlling said cache memory in such a manner that:

when in response to the fetching request from said apparatus itself for data in which the data has the status of an Invalid state, the data in a Modified state is obtained from another apparatus, the status of the obtained data is changed from an Invalid state to a Writable Modified state; and when the fetching request is received for data in a Modified state from another apparatus, the status of the data is switched from a Modified state to an Invalid state.

2. The apparatus according to claim 1, wherein in response to a storing request from said apparatus itself for data in a Writable Modified state, said cache controller switches the status of the data from a Writable Modified state to a Modified state after the data is stored.

3. The apparatus according to claim 1, wherein said cache controller controls said cache memory in such a manner that:

when the fetching request is received for data in a Writable Modified state from some other apparatuses than said apparatus in which the data is in an Invalid state, the status of the data is switched from a Writable Modified state to a Shared Modified state; and in response to the fetching request from said apparatus itself for data in an Invalid state, when data in a Writable Modified state is obtained from another apparatus, the status of the obtained data is switched from an Invalid sate to a Shared state.

4. The apparatus according to claim 3, wherein when the fetching request is received for data in a Shared Modified state from the apparatus itself or some other apparatuses, said cache controller maintains the status of the Shared Modified state.

5. The apparatus according to claim 1, wherein said cache controller controls said cache memory in such a manner that:

when the fetching request is received for data in a Writable Modified state from another apparatus in which the data is in an Invalid state, the status of the data is switched from a Writable Modified state to a Shared state; and in response to the fetching request from said apparatus itself for data in an Invalid state, when data in a Writable Modified state is obtained from some other apparatuses than said apparatus, the status of the obtained data is switched from an Invalid state to a Shared Modified state.

6. The apparatus according to claim 5, wherein said cache controller controls said cache memory in such a manner that:

when the fetching request is received for data in a Shared Modified state from said apparatus itself, the status of a Shared Modified state is maintained;

when the fetching request is received for data in a Shared Modified state from some other apparatuses than said apparatus, the status of the data is switched from a Shared Modified state to a Shared state; and in response to the fetching request from the apparatus itself for data in an Invalid state, when data in a Shared Modified state is obtained from another apparatus, the status of the obtained data is switched from an Invalid state to a Shared Modified state.

7. The apparatus according to claim 1, wherein said cache controller controls said cache memory in a manner that:

when a storing request is received for data in a Shared Modified state from said apparatus itself, the status of the data is switched from a Shared Modified state to a Modified state; and when a status change notification based on the storing request is received for data in a Shared Modified state from other apparatuses, the status of the data is switched from a shared Modified state to an Invalid state.

8. A method of controlling cache memory, comprising:

storing data from a storage device into the cache memory and storing information indicative of a status of the data; and controlling the cache memory in which the data has the status of a Writable Modified state to allow sharing performance to be possessed step by step in response to a fetching request, said controlling further comprising:

obtaining the data in a Modified state in response to the fetching request for data in which the data has the status of an Invalid state, and changing the status of the obtained data from an invalid state to a Writable Modified state; and switching the status of the data from a Modified state to an Invalid state when the fetching request is received for data in a Modified state.

9. A multiprocessor system comprising:

a storage device;

a plurality of processing modules connected to said storage device, each processing module having:

a cache memory storing data from said storage device and storing information indicative of a status of the data; and a cache controller controlling said cache memory in which the data has the status of a Writable Modified state to allow sharing performance to be possessed step by step in response a fetching request, said cache controller further controlling said cache memory in such a manner that:

when in response to the fetching request from said apparatus itself for data in which the data has the status of an Invalid state, the data in a Modified state is obtained from another apparatus, the status of the obtained data is changed from an Invalid state to a Writable Modified state; and when the fetching request is received for data in a Modified state from another apparatus, the status of the data is switched from a Modified state to an Invalid state.

10. An apparatus within a multiprocessor system having a storage device, comprising:

a cache memory storing data from the storage device and information indicative of a status of the data; and a cache controller controlling said cache memory in which the data has the status of a writable modified state to finely divide the state of the data to be managed on said cache memory, so that the number of state changing requests to another apparatus is reduced, said cache controller further controlling said cache memory in such a manner that:

when in response to the fetching request from said apparatus itself for data in which the data has the status of an Invalid state, the data in a Modified state is obtained from another apparatus, the status of the obtained data is changed from an Invalid state to a Writable Modified state; and when the fetching request is received for data in a Modified state from another apparatus, the status of the data is switched from a Modified state to an Invalid state.

11. A method of controlling cache memory, comprising:

storing data from a storage device into the cache memory, and storing information indicative of a status of the data; and controlling the cache memory in which the data has the status of a writable modified state to finely divide the state of the data to be managed on the cache memory, so that the number of state changing requests is reduced, said controlling further comprising:

obtaining the data in a modified state in response to the fetching request for data in which the data has the status of an invalid state, and changing the status of the obtained data from an invalid state to a writable modified state; and switching the status of the data from a modified state to an invalid state when the fetching request is received for data in a modified state.

* * * * *